(12) United States Patent
Nanu et al.

(10) Patent No.: US 8,170,294 B2
(45) Date of Patent: May 1, 2012

(54) METHOD OF DETECTING REDEYE IN A DIGITAL IMAGE

(75) Inventors: Florin Nanu, Bucharest (RO); Peter Corcoran, Claregalway (IE); Adrian Capata, Galway (IE); Alexandru Drimbarean, Galway (IE); Eran Steinberg, San Francisco, CA (US)

(73) Assignee: DigitalOptics Corporation Europe Limited, Galway (IE)

( * ) Notice: Subject to any disclaimer, the term of this patent is extended or adjusted under 35 U.S.C. 154(b) by 1210 days.

(21) Appl. No.: 11/936,085

(22) Filed: Nov. 7, 2007

(65) Prior Publication Data

US 2008/0112599 A1 May 15, 2008

Related U.S. Application Data

(60) Provisional application No. 60/865,375, filed on Nov. 10, 2006, provisional application No. 60/865,622, filed on Nov. 13, 2006, provisional application No. 60/915,669, filed on May 2, 2007.

(51) Int. Cl.
*G06K 9/00* (2006.01)
*G06K 9/40* (2006.01)

(52) U.S. Cl. .......................... 382/117; 382/118; 382/260

(58) Field of Classification Search .................. 382/103, 382/118, 117, 115, 165, 162, 167, 164, 274, 382/275, 173, 209, 260; 348/241, 222.1, 348/231.3, 239, E5.038, E5.031, 371, E5.078, 348/E9.037, E5.022; 358/518
See application file for complete search history.

(56) References Cited

U.S. PATENT DOCUMENTS

| 4,285,588 | A | 8/1981 | Mir |
| 4,577,219 | A | 3/1986 | Klie et al. |
| 4,646,134 | A | 2/1987 | Komatsu et al. |
| 4,777,620 | A | 10/1988 | Shimoni et al. |
| 4,881,067 | A | 11/1989 | Watanabe et al. |
| 4,978,989 | A | 12/1990 | Nakano et al. |
| 5,016,107 | A | 5/1991 | Sasson et al. |
| 5,070,355 | A | 12/1991 | Inoue et al. |
| 5,130,789 | A | 7/1992 | Dobbs et al. |
| 5,164,831 | A | 11/1992 | Kuchta et al. |
| 5,164,833 | A | 11/1992 | Aoki |

(Continued)

FOREIGN PATENT DOCUMENTS

EP 884694 A1 12/1998

(Continued)

OTHER PUBLICATIONS

Combier. Nathalie et al., "Removal of Defects on Flash Radiographic Images by Fuzzy Combination, Conference: Machine Vision Applications in Industrial Inspection III, http://rlinks2.dialog.com/NASApp/ChannelWEB/DialogProServlet?ChName=engineering", Proceedings of SPIE—The International Society for Optical Engineering, Society of Photo-Optical Instrumentation, 1995, pp. 301-312.

(Continued)

*Primary Examiner* — Sheela Chawan
(74) *Attorney, Agent, or Firm* — Andrew V. Smith

(57) ABSTRACT

A method for detecting redeye in a digital image comprises initially examining the image to detect redeyes, examining the image to detect face regions and, from the results of the preceding examinations, identifying those detected face regions each including only one detected redeye. Next, the identified face regions are examined, using less stringent search criteria than the initial examination, to detect additional redeyes in the face regions.

24 Claims, 4 Drawing Sheets

U.S. PATENT DOCUMENTS

| | | | |
|---|---|---|---|
| 5,202,720 A | 4/1993 | Fujino et al. | |
| 5,231,674 A | 7/1993 | Cleaveland et al. | |
| 5,249,053 A | 9/1993 | Jain | |
| 5,274,457 A | 12/1993 | Kobayashi et al. | |
| 5,301,026 A | 4/1994 | Lee | |
| 5,303,049 A | 4/1994 | Ejima et al. | |
| 5,335,072 A | 8/1994 | Tanaka et al. | |
| 5,384,601 A | 1/1995 | Yamashita et al. | |
| 5,400,113 A | 3/1995 | Sosa et al. | |
| 5,432,863 A | 7/1995 | Benati et al. | |
| 5,432,866 A | 7/1995 | Sakamoto | |
| 5,452,048 A | 9/1995 | Edgar | |
| 5,455,606 A | 10/1995 | Keeling et al. | |
| 5,537,516 A | 7/1996 | Sherman et al. | |
| 5,568,187 A | 10/1996 | Okino | |
| 5,568,194 A | 10/1996 | Abe | |
| 5,671,013 A | 9/1997 | Nakao | |
| 5,694,926 A | 12/1997 | DeVries et al. | |
| 5,719,639 A | 2/1998 | Imamura | |
| 5,719,951 A | 2/1998 | Shackleton et al. | |
| 5,724,456 A | 3/1998 | Boyack et al. | |
| 5,734,425 A | 3/1998 | Takizawa et al. | |
| 5,748,764 A | 5/1998 | Benati et al. | |
| 5,748,784 A | 5/1998 | Sugiyama | |
| 5,751,836 A | 5/1998 | Wildes et al. | |
| 5,761,550 A | 6/1998 | Kancigor | |
| 5,781,650 A | 7/1998 | Lobo et al. | |
| 5,805,720 A | 9/1998 | Suenaga et al. | |
| 5,805,727 A | 9/1998 | Nakano | |
| 5,805,745 A | 9/1998 | Graf | |
| 5,815,749 A | 9/1998 | Tsukahara et al. | |
| 5,818,975 A | 10/1998 | Goodwin et al. | |
| 5,847,714 A | 12/1998 | Naqvi et al. | |
| 5,850,470 A | 12/1998 | Kung et al. | |
| 5,862,217 A | 1/1999 | Steinberg et al. | |
| 5,862,218 A | 1/1999 | Steinberg | |
| 5,892,837 A | 4/1999 | Luo et al. | |
| 5,949,904 A | 9/1999 | Delp | |
| 5,974,189 A | 10/1999 | Nicponski | |
| 5,990,973 A | 11/1999 | Sakamoto | |
| 5,991,456 A | 11/1999 | Rahman et al. | |
| 5,991,549 A | 11/1999 | Tsuchida | |
| 5,991,594 A | 11/1999 | Froeber et al. | |
| 5,999,160 A | 12/1999 | Kitamura et al. | |
| 6,006,039 A | 12/1999 | Steinberg et al. | |
| 6,009,209 A | 12/1999 | Acker et al. | |
| 6,011,547 A | 1/2000 | Shiota et al. | |
| 6,016,354 A | 1/2000 | Lin et al. | |
| 6,028,611 A | 2/2000 | Anderson et al. | |
| 6,035,072 A | 3/2000 | Read | |
| 6,035,074 A | 3/2000 | Fujimoto et al. | |
| 6,036,072 A | 3/2000 | Lee | |
| 6,101,271 A | 8/2000 | Yamashita et al. | |
| 6,104,839 A | 8/2000 | Cok et al. | |
| 6,118,485 A | 9/2000 | Hinoue et al. | |
| 6,125,213 A | 9/2000 | Morimoto | |
| 6,134,339 A | 10/2000 | Luo | |
| 6,151,403 A | 11/2000 | Luo | |
| 6,172,706 B1 | 1/2001 | Tatsumi | |
| 6,192,149 B1 | 2/2001 | Eschbach et al. | |
| 6,195,127 B1 | 2/2001 | Sugimoto | |
| 6,201,571 B1 | 3/2001 | Ota | |
| 6,204,858 B1 | 3/2001 | Gupta | |
| 6,233,364 B1 | 5/2001 | Krainiouk et al. | |
| 6,249,315 B1 | 6/2001 | Holm | |
| 6,252,976 B1 | 6/2001 | Schildkraut et al. | |
| 6,266,054 B1 | 7/2001 | Lawton et al. | |
| 6,268,939 B1 | 7/2001 | Klassen et al. | |
| 6,275,614 B1 | 8/2001 | Krishnamurthy et al. | |
| 6,278,491 B1 | 8/2001 | Wang et al. | |
| 6,285,410 B1 | 9/2001 | Marni | |
| 6,292,574 B1 | 9/2001 | Schildkraut et al. | |
| 6,295,378 B1 | 9/2001 | Kitakado et al. | |
| 6,298,166 B1 | 10/2001 | Ratnakar et al. | |
| 6,300,935 B1 | 10/2001 | Sobel et al. | |
| 6,381,345 B1 | 4/2002 | Swain | |
| 6,393,148 B1 | 5/2002 | Bhaskar | |
| 6,396,963 B2 | 5/2002 | Shaffer et al. | |
| 6,407,777 B1 | 6/2002 | DeLuca | |
| 6,421,468 B1 | 7/2002 | Ratnakar et al. | |
| 6,426,775 B1 | 7/2002 | Kurokawa | |
| 6,429,924 B1 | 8/2002 | Milch | |
| 6,433,818 B1 | 8/2002 | Steinberg et al. | |
| 6,438,264 B1 | 8/2002 | Gallagher et al. | |
| 6,441,854 B2 | 8/2002 | Fellegara et al. | |
| 6,459,436 B1 | 10/2002 | Kumada et al. | |
| 6,473,199 B1 | 10/2002 | Gilman et al. | |
| 6,496,655 B1 | 12/2002 | Malloy Desormeaux | |
| 6,501,911 B1 | 12/2002 | Malloy Desormeaux | |
| 6,505,003 B1 | 1/2003 | Malloy Desormeaux | |
| 6,510,520 B1 | 1/2003 | Steinberg | |
| 6,516,154 B1 | 2/2003 | Parulski et al. | |
| 6,614,471 B1 | 9/2003 | Ott | |
| 6,614,995 B2 | 9/2003 | Tseng | |
| 6,621,867 B1 | 9/2003 | Sazzad et al. | |
| 6,628,833 B1 | 9/2003 | Horie | |
| 6,700,614 B1 | 3/2004 | Hata | |
| 6,707,950 B1 | 3/2004 | Burns et al. | |
| 6,714,665 B1 | 3/2004 | Hanna et al. | |
| 6,718,051 B1 | 4/2004 | Eschbach | |
| 6,724,941 B1 | 4/2004 | Aoyama | |
| 6,728,401 B1 | 4/2004 | Hardeberg | |
| 6,765,686 B2 | 7/2004 | Maruoka | |
| 6,786,655 B2 | 9/2004 | Cook et al. | |
| 6,792,161 B1 | 9/2004 | Imaizumi et al. | |
| 6,798,913 B2 | 9/2004 | Toriyama | |
| 6,859,565 B2 | 2/2005 | Baron | |
| 6,873,743 B2 | 3/2005 | Steinberg | |
| 6,885,766 B2 | 4/2005 | Held et al. | |
| 6,895,112 B2 | 5/2005 | Chen et al. | |
| 6,900,882 B2 | 5/2005 | Iida | |
| 6,912,298 B1 | 6/2005 | Wilensky | |
| 6,937,997 B1 | 8/2005 | Parulski | |
| 6,967,680 B1 | 11/2005 | Kagle et al. | |
| 6,980,691 B2 | 12/2005 | Nesterov et al. | |
| 6,984,039 B2 | 1/2006 | Agostinelli | |
| 7,024,051 B2 | 4/2006 | Miller et al. | |
| 7,027,643 B2 | 4/2006 | Comaniciu et al. | |
| 7,027,662 B2 | 4/2006 | Baron | |
| 7,035,461 B2 | 4/2006 | Luo et al. | |
| 7,035,462 B2 | 4/2006 | White et al. | |
| 7,042,501 B1 | 5/2006 | Matama | |
| 7,042,505 B1 | 5/2006 | DeLuca | |
| 7,062,086 B2 | 6/2006 | Chen et al. | |
| 7,116,820 B2 | 10/2006 | Luo et al. | |
| 7,130,453 B2 | 10/2006 | Kondo et al. | |
| 7,133,070 B2 | 11/2006 | Wheeler et al. | |
| 7,155,058 B2 | 12/2006 | Gaubatz et al. | |
| 7,216,289 B2 | 5/2007 | Kagle et al. | |
| 7,224,850 B2 | 5/2007 | Zhang et al. | |
| 7,269,292 B2 | 9/2007 | Steinberg | |
| 7,289,664 B2 | 10/2007 | Enomoto | |
| 7,295,233 B2 | 11/2007 | Steinberg et al. | |
| 7,310,443 B1 | 12/2007 | Kris et al. | |
| 7,315,631 B1 | 1/2008 | Corcoran et al. | |
| 7,336,821 B2 | 2/2008 | Ciuc et al. | |
| 7,352,394 B1 | 4/2008 | DeLuca et al. | |
| 7,362,368 B2 | 4/2008 | Steinberg et al. | |
| 7,369,712 B2 | 5/2008 | Steinberg et al. | |
| 7,403,643 B2 | 7/2008 | Ianculescu et al. | |
| 7,436,998 B2 | 10/2008 | Steinberg et al. | |
| 7,454,040 B2 | 11/2008 | Luo et al. | |
| 7,515,740 B2 | 4/2009 | Corcoran et al. | |
| 7,574,069 B2 | 8/2009 | Setlur et al. | |
| 7,593,603 B1 | 9/2009 | Wilensky | |
| 7,613,332 B2 * | 11/2009 | Enomoto et al. | 382/115 |
| 7,630,006 B2 * | 12/2009 | DeLuca et al. | 348/241 |
| 7,657,060 B2 | 2/2010 | Cohen et al. | |
| 7,702,149 B2 | 4/2010 | Ohkubo et al. | |
| 7,747,071 B2 | 6/2010 | Yen et al. | |
| 2001/0015760 A1 | 8/2001 | Fellegara et al. | |
| 2001/0031142 A1 | 10/2001 | Whiteside | |
| 2001/0052937 A1 | 12/2001 | Suzuki | |
| 2002/0019859 A1 | 2/2002 | Watanabe | |
| 2002/0041329 A1 | 4/2002 | Steinberg | |
| 2002/0051571 A1 | 5/2002 | Jackway et al. | |
| 2002/0054224 A1 | 5/2002 | Wasula et al. | |

| Publication No. | Date | Inventor |
|---|---|---|
| 2002/0085088 A1 | 7/2002 | Eubanks |
| 2002/0089514 A1 | 7/2002 | Kitahara et al. |
| 2002/0090133 A1 | 7/2002 | Kim et al. |
| 2002/0093577 A1 | 7/2002 | Kitawaki et al. |
| 2002/0093633 A1 | 7/2002 | Milch |
| 2002/0105662 A1 | 8/2002 | Patton et al. |
| 2002/0114513 A1 | 8/2002 | Hirao |
| 2002/0126893 A1 | 9/2002 | Held et al. |
| 2002/0131770 A1 | 9/2002 | Meier et al. |
| 2002/0136450 A1 | 9/2002 | Chen et al. |
| 2002/0141661 A1 | 10/2002 | Steinberg |
| 2002/0150306 A1 | 10/2002 | Baron |
| 2002/0159630 A1 | 10/2002 | Buzuloiu et al. |
| 2002/0172419 A1 | 11/2002 | Lin et al. |
| 2002/0176623 A1 | 11/2002 | Steinberg |
| 2003/0007687 A1 | 1/2003 | Nesterov et al. |
| 2003/0021478 A1 | 1/2003 | Yoshida |
| 2003/0025808 A1 | 2/2003 | Parulski et al. |
| 2003/0025811 A1 | 2/2003 | Keelan et al. |
| 2003/0039402 A1 | 2/2003 | Robins et al. |
| 2003/0044063 A1 | 3/2003 | Meckes et al. |
| 2003/0044070 A1 | 3/2003 | Fuersich et al. |
| 2003/0044176 A1 | 3/2003 | Saitoh |
| 2003/0044177 A1 | 3/2003 | Oberhardt et al. |
| 2003/0044178 A1 | 3/2003 | Oberhardt et al. |
| 2003/0052991 A1 | 3/2003 | Stavely et al. |
| 2003/0058343 A1 | 3/2003 | Katayama |
| 2003/0058349 A1 | 3/2003 | Takemoto |
| 2003/0086134 A1 | 5/2003 | Enomoto |
| 2003/0086164 A1 | 5/2003 | Abe |
| 2003/0095197 A1 | 5/2003 | Wheeler et al. |
| 2003/0107649 A1 | 6/2003 | Flickner et al. |
| 2003/0118216 A1 | 6/2003 | Goldberg |
| 2003/0137597 A1 | 7/2003 | Sakamoto et al. |
| 2003/0142285 A1 | 7/2003 | Enomoto |
| 2003/0161506 A1 | 8/2003 | Velazquez et al. |
| 2003/0194143 A1 | 10/2003 | Iida |
| 2003/0202715 A1 | 10/2003 | Kinjo |
| 2004/0017481 A1 | 1/2004 | Takasumi et al. |
| 2004/0027593 A1 | 2/2004 | Wilkins |
| 2004/0032512 A1 | 2/2004 | Silverbrook |
| 2004/0032526 A1 | 2/2004 | Silverbrook |
| 2004/0033071 A1 | 2/2004 | Kubo |
| 2004/0037460 A1 | 2/2004 | Luo et al. |
| 2004/0046878 A1 | 3/2004 | Jarman |
| 2004/0047491 A1 | 3/2004 | Rydbeck |
| 2004/0056975 A1 | 3/2004 | Hata |
| 2004/0057623 A1 | 3/2004 | Schuhrke et al. |
| 2004/0057705 A1 | 3/2004 | Kohno |
| 2004/0057715 A1 | 3/2004 | Tsuchida et al. |
| 2004/0090461 A1 | 5/2004 | Adams |
| 2004/0093432 A1 | 5/2004 | Luo et al. |
| 2004/0109614 A1 | 6/2004 | Enomoto et al. |
| 2004/0114796 A1 | 6/2004 | Kaku |
| 2004/0114797 A1 | 6/2004 | Meckes |
| 2004/0114829 A1 | 6/2004 | LeFeuvre et al. |
| 2004/0114904 A1 | 6/2004 | Sun et al. |
| 2004/0119851 A1 | 6/2004 | Kaku |
| 2004/0120598 A1 | 6/2004 | Feng |
| 2004/0125387 A1 | 7/2004 | Nagao et al. |
| 2004/0126086 A1 | 7/2004 | Nakamura et al. |
| 2004/0141657 A1 | 7/2004 | Jarman |
| 2004/0150743 A1 | 8/2004 | Schinner |
| 2004/0160517 A1 | 8/2004 | Iida |
| 2004/0165215 A1 | 8/2004 | Raguet et al. |
| 2004/0184044 A1 | 9/2004 | Kolb et al. |
| 2004/0184670 A1 | 9/2004 | Jarman et al. |
| 2004/0196292 A1 | 10/2004 | Okamura |
| 2004/0196503 A1 | 10/2004 | Kurtenbach et al. |
| 2004/0213476 A1 | 10/2004 | Luo et al. |
| 2004/0223063 A1 | 11/2004 | DeLuca et al. |
| 2004/0227978 A1 | 11/2004 | Enomoto |
| 2004/0228542 A1 | 11/2004 | Zhang et al. |
| 2004/0233299 A1 | 11/2004 | Ioffe et al. |
| 2004/0233301 A1 | 11/2004 | Nakata et al. |
| 2004/0234156 A1 | 11/2004 | Watanabe et al. |
| 2004/0239779 A1 | 12/2004 | Washisu |
| 2004/0240747 A1 | 12/2004 | Jarman et al. |
| 2004/0258308 A1 | 12/2004 | Sadovsky et al. |
| 2005/0001024 A1 | 1/2005 | Kusaka et al. |
| 2005/0013602 A1 | 1/2005 | Ogawa |
| 2005/0013603 A1 | 1/2005 | Ichimasa |
| 2005/0024498 A1 | 2/2005 | Iida et al. |
| 2005/0031224 A1 | 2/2005 | Prilutsky et al. |
| 2005/0041121 A1 | 2/2005 | Steinberg et al. |
| 2005/0047655 A1 | 3/2005 | Luo et al. |
| 2005/0047656 A1 | 3/2005 | Luo et al. |
| 2005/0053279 A1 | 3/2005 | Chen et al. |
| 2005/0058340 A1 | 3/2005 | Chen et al. |
| 2005/0058342 A1 | 3/2005 | Chen et al. |
| 2005/0062856 A1 | 3/2005 | Matsushita |
| 2005/0063083 A1 | 3/2005 | Dart et al. |
| 2005/0068452 A1 | 3/2005 | Steinberg et al. |
| 2005/0074164 A1 | 4/2005 | Yonaha |
| 2005/0074179 A1 | 4/2005 | Wilensky |
| 2005/0078191 A1 | 4/2005 | Battles |
| 2005/0117132 A1 | 6/2005 | Agostinelli |
| 2005/0129331 A1 | 6/2005 | Kakiuchi et al. |
| 2005/0140801 A1 | 6/2005 | Prilutsky et al. |
| 2005/0147278 A1 | 7/2005 | Rui et al. |
| 2005/0151943 A1 | 7/2005 | Iida |
| 2005/0163498 A1 | 7/2005 | Battles et al. |
| 2005/0168965 A1 | 8/2005 | Yoshida |
| 2005/0196067 A1 | 9/2005 | Gallagher et al. |
| 2005/0200736 A1 | 9/2005 | Ito |
| 2005/0207649 A1 | 9/2005 | Enomoto et al. |
| 2005/0212955 A1 | 9/2005 | Craig et al. |
| 2005/0219385 A1 | 10/2005 | Terakawa |
| 2005/0219608 A1 | 10/2005 | Wada |
| 2005/0220346 A1 | 10/2005 | Akahori |
| 2005/0220347 A1 | 10/2005 | Enomoto et al. |
| 2005/0226499 A1 | 10/2005 | Terakawa |
| 2005/0232490 A1 | 10/2005 | Itagaki et al. |
| 2005/0238230 A1 | 10/2005 | Yoshida |
| 2005/0243348 A1 | 11/2005 | Yonaha |
| 2005/0275734 A1 | 12/2005 | Ikeda |
| 2005/0276481 A1 | 12/2005 | Enomoto |
| 2005/0280717 A1 | 12/2005 | Sugimoto |
| 2005/0286766 A1 | 12/2005 | Ferman |
| 2006/0008171 A1 | 1/2006 | Petschnigg et al. |
| 2006/0017825 A1 | 1/2006 | Thakur |
| 2006/0038916 A1 | 2/2006 | Knoedgen et al. |
| 2006/0039690 A1 | 2/2006 | Steinberg et al. |
| 2006/0045352 A1 | 3/2006 | Gallagher |
| 2006/0050300 A1 | 3/2006 | Mitani et al. |
| 2006/0066628 A1 | 3/2006 | Brodie et al. |
| 2006/0082847 A1 | 4/2006 | Sugimoto |
| 2006/0093212 A1 | 5/2006 | Steinberg et al. |
| 2006/0093213 A1 | 5/2006 | Steinberg et al. |
| 2006/0093238 A1 | 5/2006 | Steinberg et al. |
| 2006/0098867 A1 | 5/2006 | Gallagher |
| 2006/0098875 A1 | 5/2006 | Sugimoto |
| 2006/0119832 A1 | 6/2006 | Iida |
| 2006/0120599 A1 | 6/2006 | Steinberg et al. |
| 2006/0140455 A1 | 6/2006 | Costache et al. |
| 2006/0150089 A1 | 7/2006 | Jensen et al. |
| 2006/0203108 A1 | 9/2006 | Steinberg et al. |
| 2006/0204052 A1 | 9/2006 | Yokouchi |
| 2006/0204110 A1 | 9/2006 | Steinberg et al. |
| 2006/0221408 A1 | 10/2006 | Fukuda |
| 2006/0280361 A1 | 12/2006 | Umeda |
| 2006/0280375 A1 | 12/2006 | Dalton et al. |
| 2006/0285754 A1 | 12/2006 | Steinberg et al. |
| 2007/0098260 A1 | 5/2007 | Yen et al. |
| 2007/0110305 A1 | 5/2007 | Corcoran et al. |
| 2007/0116379 A1 | 5/2007 | Corcoran et al. |
| 2007/0116380 A1 | 5/2007 | Ciuc et al. |
| 2007/0201724 A1 | 8/2007 | Steinberg et al. |
| 2007/0263104 A1 | 11/2007 | DeLuca et al. |
| 2008/0002060 A1 | 1/2008 | DeLuca et al. |
| 2008/0013798 A1 | 1/2008 | Ionita et al. |
| 2008/0043121 A1 | 2/2008 | Prilutsky et al. |
| 2008/0112599 A1 | 5/2008 | Capata et al. |
| 2008/0144965 A1 | 6/2008 | Steinberg et al. |
| 2008/0186389 A1 | 8/2008 | DeLuca et al. |
| 2008/0211937 A1 | 9/2008 | Steinberg et al. |
| 2008/0219518 A1 | 9/2008 | Steinberg et al. |

| | | | |
|---|---|---|---|
| 2008/0232711 | A1 | 9/2008 | Prilutsky et al. |
| 2008/0240555 | A1 | 10/2008 | Nanu et al. |
| 2011/0222730 | A1 | 9/2011 | Steinberg et al. |

FOREIGN PATENT DOCUMENTS

| | | | |
|---|---|---|---|
| EP | 911759 A2 | 4/1999 | |
| EP | 911759 A3 | 6/2000 | |
| EP | 1199672 A2 | 4/2002 | |
| EP | 1229486 A1 | 8/2002 | |
| EP | 1288858 A1 | 3/2003 | |
| EP | 1288859 A1 | 3/2003 | |
| EP | 1288860 A1 | 3/2003 | |
| EP | 1293933 A1 | 3/2003 | |
| EP | 1296510 A2 | 3/2003 | |
| EP | 1429290 A2 | 6/2004 | |
| EP | 1478169 A2 | 11/2004 | |
| EP | 1528509 A2 | 5/2005 | |
| EP | 979487 B1 | 3/2006 | |
| EP | 1429290 B1 | 7/2008 | |
| EP | 2227002 A2 | 9/2008 | |
| EP | 2165523 B1 | 4/2011 | |
| GB | 841609 A | 7/1960 | |
| JP | 4192681 A2 | 7/1992 | |
| JP | 5224271 A2 | 9/1993 | |
| JP | 9214839 A2 | 8/1997 | |
| JP | 20134486 A2 | 5/2000 | |
| JP | 22247596 A2 | 8/2002 | |
| JP | 22271808 A2 | 9/2002 | |
| WO | WO-9802844 A1 | 1/1998 | |
| WO | WO-9917254 A1 | 4/1999 | |
| WO | WO-9933684 A2 | 7/1999 | |
| WO | WO-0171421 A1 | 9/2001 | |
| WO | WO-0192614 A1 | 12/2001 | |
| WO | WO-0245003 A1 | 6/2002 | |
| WO | WO03/019473 A1 | 3/2003 | |
| WO | WO-03026278 A1 | 3/2003 | |
| WO | WO-03071484 A1 | 8/2003 | |
| WO | WO-2004034696 A1 | 4/2004 | |
| WO | WO2005/015896 A1 | 2/2005 | |
| WO | WO-2005015896 A1 | 2/2005 | |
| WO | WO-2005041558 A1 | 5/2005 | |
| WO | WO2005/076217 A2 | 8/2005 | |
| WO | WO-2005076217 A2 | 8/2005 | |
| WO | WO-2005076217 A3 | 8/2005 | |
| WO | WO-2005087994 A1 | 9/2005 | |
| WO | WO2005/076217 A9 | 10/2005 | |
| WO | WO-2005109853 A1 | 11/2005 | |
| WO | WO-2006011635 A1 | 2/2006 | |
| WO | WO-2006018056 A1 | 2/2006 | |
| WO | WO2005/076217 A3 | 4/2006 | |
| WO | WO-2006045441 A1 | 5/2006 | |
| WO | WO-2007057063 A1 | 5/2007 | |
| WO | WO-2007057064 A1 | 5/2007 | |
| WO | WO-2007093199 A2 | 8/2007 | |
| WO | WO-2007093199 A3 | 8/2007 | |
| WO | WO-2007095553 A2 | 8/2007 | |
| WO | WO-2007095553 A3 | 8/2007 | |
| WO | WO-2007142621 A1 | 12/2007 | |
| WO | WO-2008023280 A2 | 2/2008 | |
| WO | WO2008/109708 A1 | 9/2008 | |
| WO | WO-2008109644 A2 | 9/2008 | |
| WO | WO-2008109644 A3 | 9/2008 | |
| WO | WO2010/017953 A1 | 2/2010 | |

OTHER PUBLICATIONS

Corcoran. P. et al., "Automated In-Camera Detection of Flash-Eye Defects", IEEE Transactions on Consumer Electronics, 2005, pp. 11-17, vol. 51—Issue 1.
Cucchiara, R. et al., "Detection of Luminosity Profiles of Elongated Shapes", International Conference on Image Processing, 1996, pp. 635-638, vol. 3.
EPO Communication pursuant to Article 94(3) EPC, for European Patent Application No. 05 792 584.4, paper dated May 13, 2008, 8 pages.
European Patent Office, Communication pursuant to Article 94(3) EPC for Application No. 04763763.2, dated Mar. 7, 2008, 7 pages.
European Patent Office, Communication pursuant to Article 96(2) EPC for Application No. 04763763.2, dated Aug. 29, 2006, 4 pages.
Examination Report for European patent application No. 05792584. 4, dated May 13, 2008, 8 pgs.
Gaubatz, Matthew et al., "Automatic Red-Eye Detection and Correction", IEEE ICIP, Proceedings 2002 Intl Conference on Image Processing, 2002, pp. 1-804-1-807, vol. 2—Issue 3.
Han, T. et al., "Detection and Correction of abnormal Pixels in Hyperion Images", IEEE International Symposium on Geoscience and Remote Sensing, 2002, pp. 1327-1330, vol. 3.
Iivarinen, J. et al., "Content-Based Retrieval of Defect Images, http://www.cs.tut.fi/.about.avisa/digger/Publications/acivs02.pdf", Proceedings of Advanced Concepts for Intelligent Vision, Laboratory of Computer Information Science, 2002.
Ioffe, S., "Red eye detection with machine learning", Proceedings 2003 International Conference on Image Processing, 2003, pp. 871-874, vol. 2—Issue 3.
Ito, M., "An Automated System for LSI Fine Pattern Inspection Based on Comparison of Sem Images and Cad Data", IEEE Intl Conf on Robotics and Automation, 1995, pp. 544-549, vol. 1.
Jin, B. et al., "Modeling and Analysis of Soft-Test/Repair for CCD-Based Digital X-Ray Systems", Instrumentation and Measurement, IEEE Trans, 2003, pp. 1713-1721, vol. 52—Issue 6.
Nguyen, Karlene et al., "Differences in the Infrared Bright Pupil Response of Human Eyes", Proceedings of the 2002 symposium on Eye tracking research and applications, 2002, pp. 133-138.
Patent Abstracts of Japan, publication No. 2000050062, Image Input Device, application No. 10-217124, published Feb. 18, 2000, 1 page.
PCT International Preliminary Report on Patentability (IPRP) for PCT Application PCT/EP2005/011010, dated Jan. 23, 2007, 18 pages.
PCT International Preliminary Report on Patentability for PCT Application No. PCT/EP2005/005907, dated Nov. 15, 2006, 8 pages.
PCT International Preliminary Report on Patentability for PCT Application PCT/EP2004/008706, dated Feb. 6, 2006, 7 pages.
PCT International Preliminary Report on Patentability for PCT Application PCT/EP2004/010199, dated Apr. 3, 2006, 7 pages.
PCT International Search Report and the Written Opinion of the International Searching Authority, or the Declaration, for PCT Application No. PCT/US2008/055864, dated Jul. 30, 2008, 8 pages.
PCT International Search Report and Written Opinion of the International Searching Authority for PCT Application No. PCT/EP2004/008706, dated Nov. 19, 2004, 13 pages.
PCT International Search Report and Written Opinion of the International Searching Authority for PCT Application No. PCT/EP2005/005033.
PCT Notification Concerning Transmittal of International Preliminary Report on Patentability, for PCT Application No. PCT/US2007/062090, dated Aug. 28, 2008, 6 pages.
PCT Notification of Transmittal of the International Search Report and the Written Opinion of the Intl Searching Authority, or the Declaration (PCT/EP2006/008342), dated Dec. 28, 2006.
PCT Notification of Transmittal of the International Search Report and the Written Opinion of the Intl Searching Authority, or the Declaration for PCT Application No. PCT/US07/62090 issued Mar. 10, 2008, 10 pages.
PCT Notification of Transmittal of the International Search Report and the Written Opinion of the Intl Searching Authority, or the Declaration for PCT/EP/2005/011010, Jan. 23, 2006, 14 pages.
PCT Notification of Transmittal of the International Search Report and the Written Opinion of the Intl Searching Authority, or the Declaration for PCT/EP/2005/05907, Aug. 1, 2005, 12 pages.
PCT Notification of Transmittal of the International Search Report and the Written Opinion of the Intl Searching Authority, or the Declaration, for PCT Application No. PCT/EP2006/008358, Dec. 5, 2006, 14 pages.
PCT Notification of Transmittal of the International Search Report and the Written Opinion of the Intl Searching Authority, or the Declaration, for PCT Application No. PCT/US2008/055964, paper Jul. 30, 2008, 8 Pages.
PCT Notification of Transmittal of the International Search Report and the Written Opinion of the Intl Searching Authority, or the Declaration, for PCT/EP2004/010199, Dec. 13, 2004, 13 pgs.

PCT Notification of Transmittal of the International Search Report and Written Opinion of the International Searching Authority for PCT Application No. PCT/EP2005/001171, (11 pages).

Plotnikov, Yuri et al., "Advanced Image Processing for Defect Visualization in Infrared Thermography, http://citeseer.ist.psu.edu/plotnikov98advanced.html", NASA Langley Research Center, M.S. Posted: ACM Portal, 1998.

Plotnikov, Yuri et al., Winfree, "Visualization of Subsurface Defects in Composites Using a Focal Plane Array Infrared Camera, http://citeseer.ist.psu.edu/357066.html", NASA Langley Research Center, 1999.

Sahba, F. et al., "Filter Fusion for Image Enhancement Using Reinforcement Learning. XP010654204, ISBN: 0-7803-7781-8", Canadian Conference on Electrical and computer Engineering, 2003, pp. 847-850, vol. 3.

Shen, Jianhong, "Inpainting and the Fundamental Problem of Image Processing", 2002. 6 pages.

Smolka, B. et al., "Towards Automatic Redeye Effect Removal, XP004416063", Pattern Recognition Letters, 2003, pp. 1767-1785, vol. 24—Issue 11, North-Holland Publ.

Soriano, M. et al., "Making Saturated Facial Images Useful Again, XP002325961, ISSN: 0277-786X", Proceedings of the SPIE, 1999, pp. 113-121, vol. 3826.

Tan, Yap-peng et al., "Robust Sequential Approach for the Detection of Defective Pixels in an Image Sensor, http:// ieeexplorejeee.org/search/freesrchabstract.jsp?arnumber+758382
andisnumber+16342andpunumber+6110andk2dock ey+758382 © ieeecnfsandquery+%28%28%28%28images+and+defects+and+correction%29%29%29%29+%3Cin%3E", IEEE International Conference on Acoustics, Speech, and Signal Processing, 1999, pp. 2239-2242, vol. 4.

Toet, A., "Multiscale Color Image Enhancement, Posted online: 200208-06   18:09:24.0   http://ieeexplore.ieee.org/search/freesrchabstract.jsp?arnumber+146865andisnumber+3917
andpunumber+1197andk2dockey
+146865©ieecnfsandquery+%28%28images+and
+defects+and+luminance%29%29+%3Cin%3E+metadataandpos+1", International Conference on Image Processing and its Applications, 1992, pp. 583-585.

U.S. Appl. No. 10/772,767, filed Feb. 4, 2004, by invs Michael J. DeLuca, et al.

U.S. Appl. No. 10/170,511, filed Jun. 12, 2002, inventor Michael J. DeLuca.

U.S. Appl. No. 11/217,788, filed Aug. 30, 2005, inventors Eran Steinberg, et al.

United Kingdom Search Report dated May 22, 2007, issued in Application No. GB 0701957.3.

Willamowski, J. et al., "Probabilistic Automatic Red Eye Detection and Correction", The 18th International Conference on Pattern Recognition (ICPR'06), 2006, pp. 762-765, vol. 3, IEEE Computer Society.

Corinne Vachier, Luc Vincent, Valuation of Image Extrema Using Alternating Filters by Reconstruction, Proceedings of the SPIE—The International Society for Optical Engineering, 1995, vol. 2568, pp. 94-103.

EPO Communication pursuant to Article 94(3) EPC, for European patent application No. 05707215.9, report dated Sep. 14, 2010, 11 Pages.

EPO Communication under Rule 71(3) EPC, for European patent application No. 09706058.6, report dated Oct. 4, 2010, 6 Pages.

EPO Extended European Search Report, for European application No. 10164430.0, dated Sep. 6, 2010, including The extended European search report, pursuant to Rule 62 EPC, the European search report (R. 61 EPC) or the partial European search report/declaration of no search (R. 63 EPC) and the European search opinion, 8 pages.

PCT Notification of Transmittal of the International Search Report and the Written Opinion of the International Searching Authority, or the Declaration, for PCT Application No. PCT/US2008/055964, dated Jul. 30, 2008, 8 pages.

PCT Written Opinion of the International Searching Authority, for PCT Application No. PCT/US2008/055964, dated Jul. 24, 2008, 5 pages.

PCT International Preliminary Report on Patentability for PCT Application No. PCT/US2008/055964, dated Sep. 8, 2009, 6 pages.

Cuiping Zhang and Fernand S. Cohen, Component-Based Active Appearance Models for Face Modelling, D. Zhang and A.K. Jain (Eds.): ICB 2006, LNCS 3832, pp. 206-212, 2005, Springer-Verlag Berlin Heidelberg 2005.

Fundus Photograph Reading Center—Modified 3-Standard Field Color Fundus Photography and Fluorescein Angiography Procedure, Retrieved from the Internet on Oct. 19, 2011, URL: http://eyephoto.ophth.wisc.edu/Photography/Protocols/mod3-ver1.4.html, 3 Pages.

Anatomy of the Eye, Retrieved from the Internet on Oct. 19, 2011, URL: http://www.stlukeseye.com/anatomy, 3 pages.

Fovea centralis, Retrieved from the Internet on Oct. 19, 2011, URL: http://en.wikipedia.org/wiki/Fovea, 4 pages.

Non-Final Office Action mailed Apr. 28, 2011, for U.S. Appl. No. 11/936,085, filed Nov. 7, 2007.

Non-Final Office Action mailed Apr. 28, 2011, for U.S. Appl. No. 11/937,377, filed Nov. 8, 2007.

Non-Final Office Action mailed Mar 31, 2011, for U.S. Appl. No. 12/551,312, filed Aug. 31, 2009.

Non-Final Office Action mailed May 2, 2011, for U.S. Appl. No. 12/824,214, filed Jun. 27, 2010.

Notice of Allowance mailed Feb. 4, 2011, for U.S. Appl. No. 12/611,387, filed Nov. 3, 2009.

Notice of Allowance mailed Mar. 3, 2011, for U.S. Appl. No. 12/543,405, filed Aug. 18, 2009.

Final Office Action mailed Feb. 16, 2011, for U.S. Appl. No. 12/543,405, filed Aug. 18, 2009.

Final Office Action mailed Jan. 5, 2011, for U.S. Appl. No. 12/611,387, filed Nov. 3, 2009.

Notice of Allowance mailed May 12, 2011, for U.S. Appl. No. 12/043,025, filed Mar. 5, 2008.

Final Office Action mailed Feb. 2, 2011, for U.S. Appl. No. 12/613,457, filed Nov. 5, 2009.

Notice of Allowance mailed Mar. 17, 2011, for U.S. Appl. No. 12/042,335, filed Mar. 5, 2008.

Patent Abstracts of Japan, for Publication No. JP2002-247596, published Aug. 30, 2002, (Appl. No. 2001-044807), Program For Specifying Red Eye Area in Image, Image Processor and Recording Medium. 1 Page.

* cited by examiner

METHOD OF DETECTING REDEYE IN A DIGITAL IMAGE

CLAIM OF PRIORITY

The present application claims priority to U.S. Provisional Patent Application No. 60/865,375, entitled "A Method of Detecting Redeye in a Digital Image", filed on Nov. 10, 2006 and to U.S. Provisional Patent Application No. 60/865,622, entitled "A Method of Detecting Redeye in a Digital Image", filed on Nov. 13, 2006 and to U.S. Provisional Patent Application No. 60/915,669, entitled "A Method of Detecting Redeye in a Digital Image", filed on May 2, 2007, each of which is incorporated by reference in its entirety.

FIELD OF THE INVENTION

The invention relates generally to a method of detecting redeye in a digital image, and specifically method of detecting a second redeye by the knowledge of the existence of a first redeye. In the present specification "redeye" means any flash-induced artefact in an image of a human or animal eye.

BACKGROUND

Redeye is a phenomenon in flash photography where a flash is reflected within a subject's eye and appears in a photograph as a light, usually red, dot where the black pupil of the subject's eye would normally appear. The unnatural glowing red of an eye is due to internal reflections from the vascular membrane behind the retina, which is rich in blood vessels. This objectionable phenomenon is well understood to be caused in part by a small angle between the flash of the camera and the lens of the camera. This angle has decreased with the miniaturization of cameras with integral flash capabilities. Additional contributors include the relative closeness of the subject to the camera and ambient light levels.

The redeye phenomenon can be minimized by causing the iris to reduce the opening of the pupil. This is typically done with a "pre-flash", a flash or illumination of light shortly before a flash photograph is taken. This causes the iris to close. Unfortunately, the pre-flash is an objectionable 0.2 to 0.6 seconds prior to the flash photograph. This delay is readily discernible and easily within the reaction time of a human subject. Consequently the subject may believe the pre-flash is the actual photograph and be in a less than desirable position at the time of the actual photograph. Alternately, the subject must be informed of the pre-flash, typically losing any spontaneity of the subject captured in the photograph. It is desired to have a redeye reduction technique involving no visible pre-flash.

Digital photography eliminates the need for film as the image is digitally captured and stored in a memory array for display on a display screen on the camera itself. This allows photographs to be viewed and enjoyed virtually instantaneously as opposed to waiting for film processing. Furthermore, the digitally captured image may be downloaded from the camera to other digital photography equipment, such as a suitably programmed personal computer, colour printer or "photo kiosk", for enhanced viewing and printing. Digital photography equipment includes microprocessors for image processing and compression and camera systems control. It is recognized herein that it would be advantageous to exploit the computation capabilities of such microprocessors for performing operations to improve redeye detection and elimination.

Redeye detection in digital images is generally achieved using either direct or indirect redeye detection methods.

Direct detection involves the examination of successive regions of an image to detect redeyes. This method is not concerned with the detection of redeye pairs, nor with the prior detection of faces. Although this method detects a high percentage of redeyes, due to the fact that it treats each region independently, in some cases only one of a pair of redeyes is detected. A direct redeye detection filter is described in U.S. Pat. No. 6,407,777, and see U.S. Pat. No. 7,042,505, and US published applications 2004/0223063, 2005/0031224, 2005/0140801, 2005/0041121, 2006/0093213, 2006/0093238 and 2006/0120599, and the subject matter disclosed in each of these documents is hereby incorporated by reference.

Indirect redeye detection involves, firstly, detecting face regions within an image, and then examining those face regions to detect redeye pairs. It is desired to have an effective technique even where there are poor face detection rates. It is also desired to have a technique that works even when only single redeyes appear in a face.

An example of a well-known fast-face detection algorithm is disclosed in Viola, P. and M. Jones, Robust real time object detection. In IEEE ICCV Workshop on Statistical and quadrature. Computational Theories of Vision, Vancouver, Canada, Jul. 13, 2001; U.S. Pat. Nos. 7,050,607; 7,099,510; 7,031,499; and 7,020,337; and US published patent applications nos. 20060126938, 20060120572, 20060045337, 20050065802, and 20030108244, and the subject matter disclosed in each of these documents is hereby incorporated by reference.

In many cases the existence of one redeye does not mean that the second eye will also have a redeye, nor that the artifact will look the same. This is due to the disparity between the eyes which may result in different reflection form the camera flash. However, in many cases, both eyes have redeye artifact. Thus a problem that can arise itch existing redeye detection software is that often only one of a pair of redeyes is detected. Therefore, a resulting corrected image might include only one corrected redeye along with one uncorrected redeye. To most people this is less desirable even than leaving both redeyes uncorrected, and it is certainly undesirable compared to having two eyes each without redeye artifact.

Existing methods of processing single redeyes are disclosed in US 2005/0232490 and the article "An Efficient Automatic Redeye Detection and Correction Algorithm", by Huitao Luo et. al., 17th International Conference on Pattern Recognition (ICPR'04)—Volume 2, pp. 883-886, each is hereby incorporated by reference. It is desired to have a more efficient and practical technique.

SUMMARY OF THE INVENTION

A method is provided for detecting redeye in a digital image. At least a portion of an image is examined to detect redeye artifact. The image is examined for detecting face regions. Based on the results of these examinations those detected face regions are identified which include only one detected redeye. At least a portion of the identified face regions having only one redeye are examined, and using different search criteria, additional redeyes are detected in the face regions. Preferably two or more of these results are combined in a comprehensive approach.

In one embodiment, the identifying of face regions having only one redeye includes identifying those detected face regions each having no detected redeyes.

A further method is provided for detecting redeye in a digital image. At least a portion of an image is examined to detect redeyes, and the image is examined for detected face regions. Each of the detected face regions having no detected redeyes are identified. At least a portion of the face regions identified as having no redeyes are examined, and using different search criteria, additional redeyes are detected in the face regions. Preferably two or more of these results are combined in a comprehensive approach.

In an embodiment, each of the detected face regions having only one detected redeye is identified.

The search criteria utilized for detecting face regions having no redeyes or only one redeye, or both, are less stringent than the search criteria utilized in initially detecting redeyes.

The search criteria may include a filter set, and a filter set utilized for detect face regions having no redeyes or only one redeye, or both, may be modified to include fewer filters than a filter set utilized in initially detected redeyes.

The filter set utilized in detecting face having no redeyes or only one redeye, or both, may be modified to include alternative filters to the filter set initially utilized to detect redeyes.

Filter parameters of a filter set utilized in detecting face regions having no redeyes or only one redeye, or both, may be set more broadly than those of a filter set utilized in initially detected redeyes.

BRIEF DESCRIPTION OF DRAWINGS

Embodiments will now be described, by way of example, with reference to the accompanying drawings, in which.

DESCRIPTION OF PREFERRED EMBODIMENTS

Figure 1:
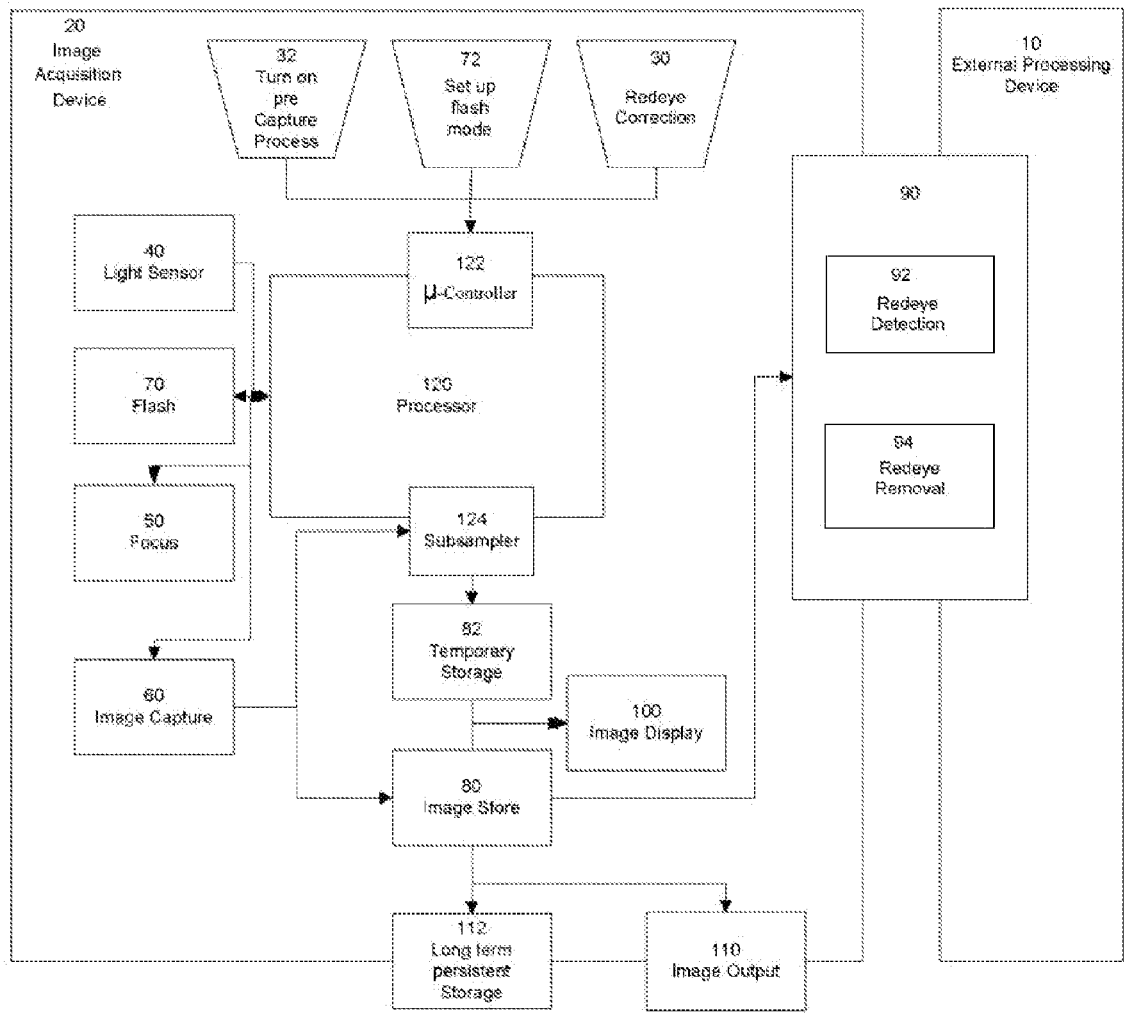
FIG. 1 is a block diagram of a digital camera operating in accordance with embodiments.

FIG. 1 is a block diagram of an image acquisition device 20, which in the present embodiment is a portable digital camera, operating in accordance with embodiments. It will be appreciated that many of the processes implemented in the digital camera are implemented in or controlled by software operating on a microprocessor, central processing unit, controller, digital signal processor and/or an application specific integrated circuit, collectively depicted as processor 120. All user interface and control of peripheral components such as buttons and display is controlled by a microcontroller 122. The processor 120, in response to a user input at 122, such as half pressing a shutter button (pre-capture mode 32), initiates and controls the digital photographic process. Ambient light exposure is determined using a light sensor 40 in order to automatically determine if a flash is to be used. The distance to the subject is determined using a focusing mechanism 50 which also focuses the image on an image capture device 60. If a flash is to be used, processor 120 causes a flash device 70 to generate a photographic flash in substantial coincidence with the recording of the image by the image capture device 60 upon full depression of the shutter button. The image capture device 60 digitally records the image in colour. The image capture device is known to those familiar with the art and may include a CCD (charge coupled device) or CMOS to facilitate digital recording. The flash may be selectively generated either in response to the light sensor 40 or a manual input 72 from the user of the camera. The high resolution image recorded by image capture device 60 is stored in an image store 80 which may comprise computer memory such a dynamic random access memory or a non-volatile memory. The camera is equipped with a display 100, such as an LCD, for preview images.

In the case of preview images which are generated in the pre-capture mode 32 with the shutter button half-pressed, the display 100 can assist the user in composing the image, as well as being used to determine focusing and exposure. Temporary storage 82 is used to store one or plurality of the preview images and can be part of the image store 80 or a separate component. The preview image is usually generated by the image capture device 60. For speed and memory efficiency reasons, preview images usually have a lower pixel resolution than the main image taken when the shutter button is fully depressed, and are generated by sub-sampling a raw captured image using software 124 which can be part of the general processor 120 or dedicated hardware or combination thereof.

A redeye detection and correction filter 90 can be integral to the camera 20 or part of an external processing device 10 such as a desktop computer, a colour printer or a photo kiosk. In this embodiment, the filter 90 receives the captured high resolution digital image from the store 80 and analyzes it, 92, to detect redeyes. The analysis 92 is performed according to the principles of the invention as described in the embodiments to follow. If redeyes are found, the filter modifies the image, 94, to remove the redeye from the image using well-known techniques. The modified image may be either displayed on image display 100, saved on a persistent storage 112 which can be internal or a removable storage such as CF card, SD card or the like, or downloaded to another device via image output means 110 which can be tethered or wireless. The redeye filter 90 can be brought into operation either automatically each time the flash is used, or upon user demand via input 30. Although illustrated as a separate item, where the filter 90 is part of the camera it may be implemented by suitable software on the processor 120.

Redeyes can be categorised as follows:

Category A: Faces containing pairs of redeyes (typically about 70%90% of relevant images).

Category B: Faces containing single redeyes (typically about 10%-30% of relevant images).

Detection results can be allocated to the following subcategories:

A1: Detection of both redeyes in a face having a pair of redeyes.

A2: Non-detection of both redeyes in a face having a pair of redeyes.

A3: Detection of only one redeye in a face having a pair of redeyes.

B1: Detection of the single redeye in a face having only a single redeye.

B2: Non-detection of the single redeye in a face having only a single redeye.

$$A=A1+A2+A3$$

$$B=B1+B2$$

Figure 2:
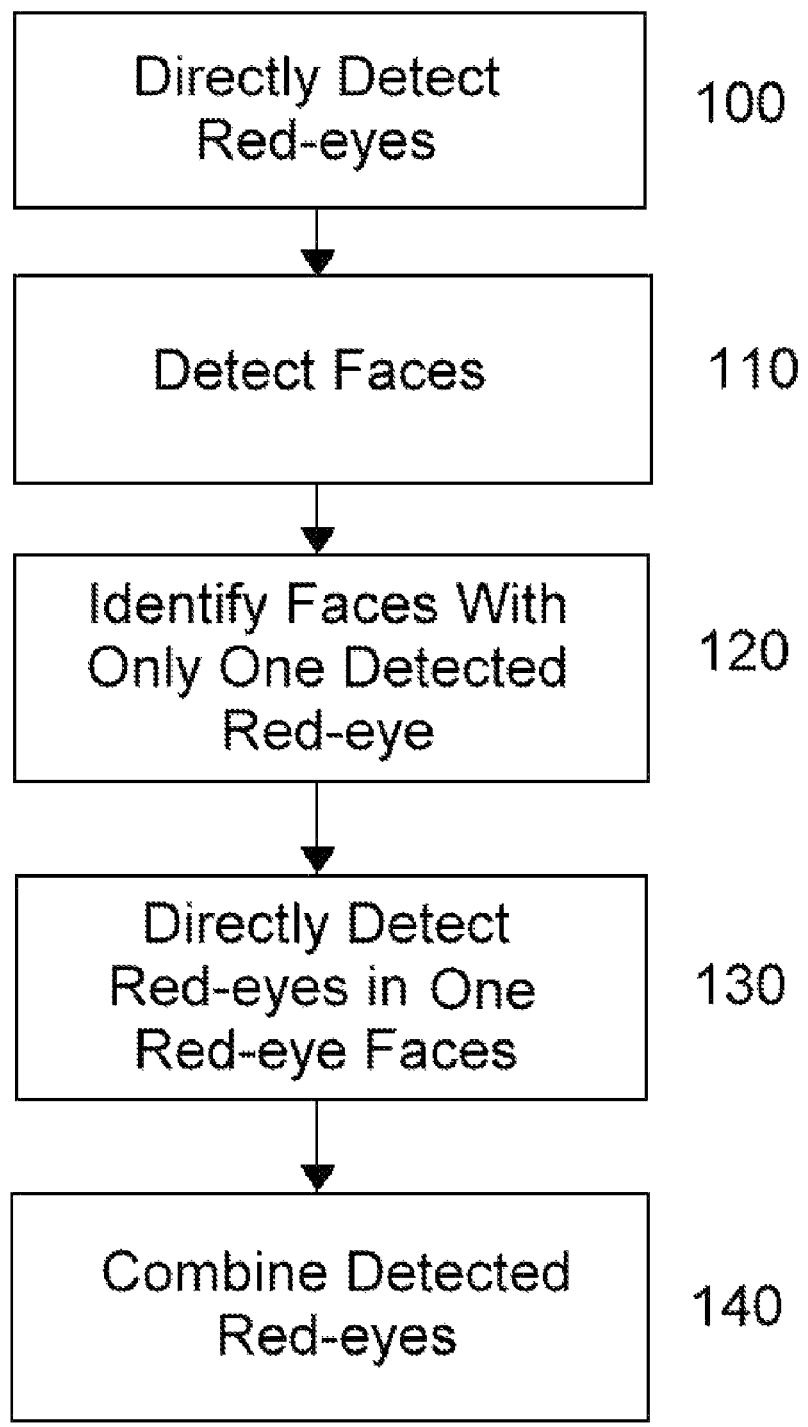
FIG. 2 is a flow diagram of a method according to a first embodiment.

A first embodiment of the invention attempts to increase the paired redeyes detection rate by reducing the A3 category and keeping B1 category high. FIG. 2 is a flow diagram of the operation of the redeye detection component 92 of the filter 90 according to the first embodiment.

First, step 100, the digital image is examined, using a direct detection method, to detect individual redeyes. A suitable direct redeye detection method is disclosed in PCT/EP2005/

011010, filed 11 Oct. 2005, and US published patent applications 2006/0120599, 2006/0093238 2006/0093213 and 2006/0093212, which are hereby incorporated by reference. The method comprises acquiring a first image and analysing the first image to provide a plurality of characteristics indicative of image quality. The method then determines if one or more corrective processes can be beneficially applied to the first image according to the characteristics. Any such corrective processes are then applied to the first image. Redeyes are then detected in a second acquired image using the corrected first image. Defect detection can comprise applying a chain of one or more redeye filters to the first image. In this case, prior to the detecting step, it is determined if the redeye filter chain can be adapted in accordance with the plurality of characteristics, and the redeye filter is adapted accordingly.

Next, step 110, the digital image is also examined to detect face regions. A suitable face detection algorithm is disclosed in U.S. application Ser. No. 11/464,083 filed Aug. 11, 2006, and another is disclosed in US published application no. 2005/0147278 (Rui), which is a development of Violla-Jones, and each is hereby incorporated by reference. Where the invention is implemented in an external image processing device 10, then face region information produced at step 110 can be stored as meta-data in a file header of the image to be corrected.

The results of steps 100 and 110 are now correlated, step 120, to identify detected face regions each including only one detected redeye.

Alternatively to the aforementioned methods of face detection, the face detection algorithms may take into account that the face is enclosing the detected eye. Thus, the face detection algorithm advantageously may be configured specific to the fact that a redeye is found and will search for the face around the detected redeye.

Now, step 130, each face region identified at step 120 is re-examined, again by a direct detection method, to detect redeyes in the face region. The aim is to detect the second redeye (if present) of a pair, the second redeye having been missed at step 100. If the same search criteria are used in the re-examination step 130 the method is no more likely to find a second redeye, if such is present, as the original examination at step 100. Thus, the search criteria used in step 130 differ from those used in step 100. In particular the search criteria are less stringent, so that step 130 is more likely to detect an additional redeye than step 100. This relaxation of the search criteria is acceptable because in this case we are only examining face regions, and a candidate redeye detected at step 130 is more likely to be an actual redeye than a spurious detection.

The re-examination may be performed using a method described in PCT/EP2005/011010 and/or any of the US applications cited above. To relax the search criteria, the filter chain may be modified to include less and/or alternative filters, and/or the filter parameters may be set broader. The re-examination at step 130 may also, depending on the filter set/parameters used, re-detect the one redeye already detected at step 100.

In some cases, an image may include a pair of eyes, each of which comprises different eye defects. For example, the detected eyes may comprise artefacts such as red, yellow, white or a combination thereof. In such cases, the search criteria may be modified by incorporating non-redeye filters into the filter chain such as yellow-eye or white-eye filters, suitable algorithms for which are disclosed in U.S. application Ser. No. 11/282,955 filed Nov. 18, 2005 and U.S. application No. 60/773,714 filed Feb. 14, 2006, each being hereby incorporated by reference.

Alternatively as means of providing different search criteria to find the suspected region in which second eye is located, the algorithm may use anthropometric data of the face in which the first eye was found. The information that may be used includes an estimated distance between the eyes, an estimated size of the face, an orientation of the face, and a location of the first eye.

The modified search being more inclusive or relaxed can also include a more sophisticated set of filters or criteria to be examined. Due to the fact that the image region is now limited as opposed to searching the full image, it is possible and feasible to run more complex algorithms to locate the second eye, knowing the location of the first eye and the limited search area in which such filters may be applied.

At step 140, any additional redeyes detected at step 130 are combined with the redeyes detected at step 100.

In a variation of the above embodiment, steps 100 and 110 are the same as for the first embodiment. However, the results of steps 100 and 110 are correlated, to identify detected face regions each having no detected redeye. Then, each detected face region is re-examined to detect any redeyes using search criteria, which differ from those used at step 100. Preferably, the search criteria are less stringent than those used at step 100. Preferably, the search criteria are more stringent than those used at step 130 of the first embodiment, as while the detection of a single defect within a face region should be more likely to be correct (B1) than without the increased confidence of the defect being within a face region, it is still desirable to avoid detecting one redeye of a pair in a face region (A3) more than missing a single redeye in a face (B2). Thus, the algorithm may include a decision step based on the confidence of finding and detecting the second eye, whether to reject the correction of the first eye or accept it as a single redeye in a face. In other words, if the algorithm finds the second eye and determines that it does not require correction, the decision to correct the first eye should be retained. However, if the algorithm cannot accurately determine the location or redeye status of the second eye it may decide that either the first eye is a false-positive, meaning not a genuine redeye, or that it is one of a pair of eyes where the second eye cannot be corrected, and thus the correction of the first eye will be suspended and not applied to the image.

An embodiment may include finding a pair of redeyes, as well as a technique for determining that what initially appears to be a redeye may be a false positive such that it is later determined not to be a redeye. A rejection of a first detected redeye may be based on not finding the second redeye. A finding of the second eye can also change a determination that a single redeye has been found to a finding that a pair of redeyes has been found. A finding of an eye that is not red, can also be followed by a closer examination of an eye that was initially determined to be a redeye, and with or without such re-examination determining whether the initial redeye is a single redeye or not.

Figure 3:
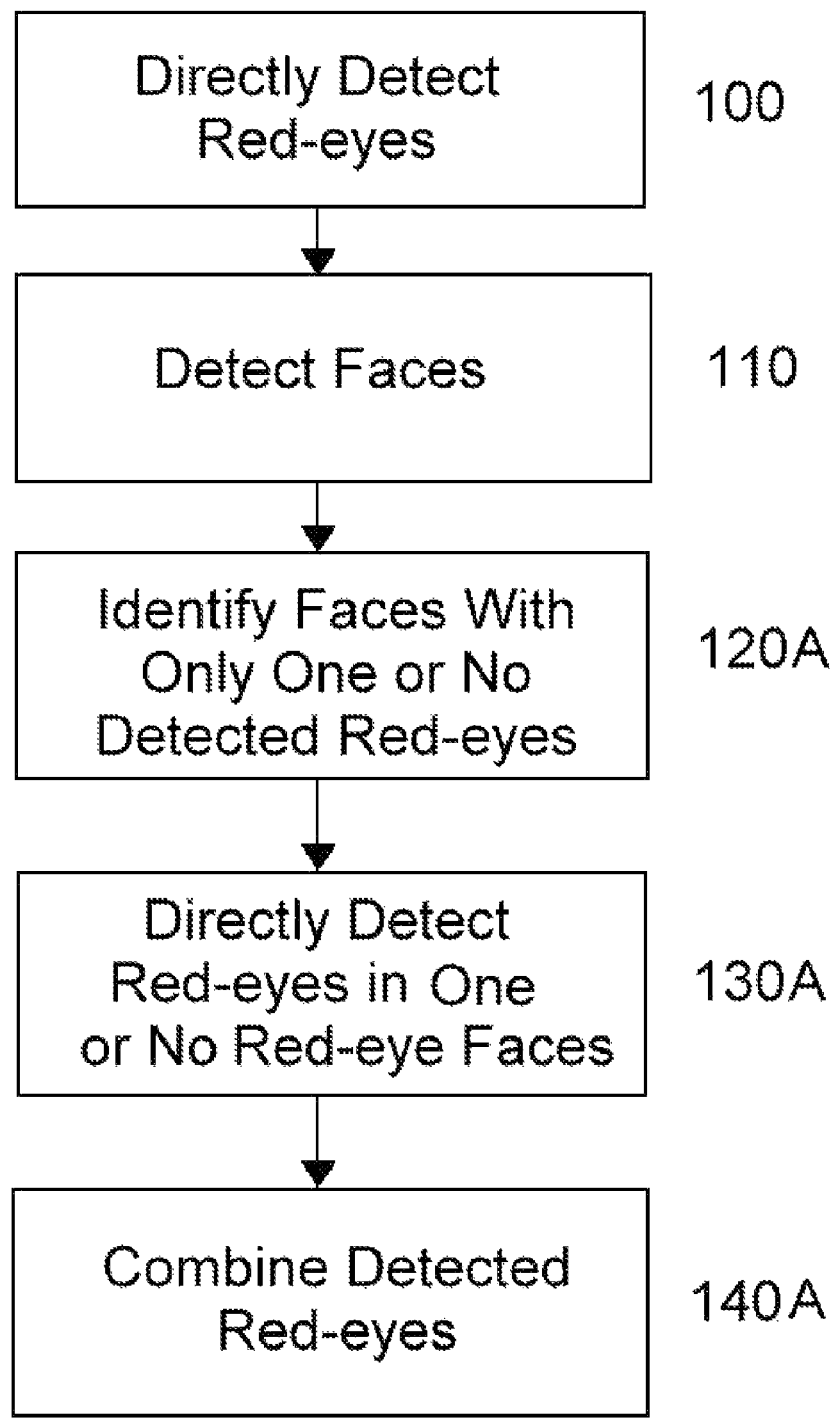
FIG. 3 is a flow diagram of a method according to a second embodiment.

FIG. 3 is a flow diagram of the operation of the redeye detection component 92 of the filter 90 according to a second embodiment of the invention. The second embodiment attempts to reduce the A2, A3 and B2 categories while keeping B1 high.

Steps 100 and 110 are the same as for the first embodiment. At step 120A, however, the results of steps 100 and 110 are correlated to identify detected face regions each including only one detected redeye or no detected redeyes.

Now, step 130A, each face region identified at step 120A is re-examined, again by a direct detection method, to detect redeyes in the face region. The aim is to detect the second redeye (if present) of a pair of redeyes of which only one was detected at step 100, and any pairs of redeyes wholly missed at step 100. Again, the search criteria used in step 130A are less stringent than those used in step 100, so that step 130A is more likely to detect an additional redeye, or a missed pair of redeyes, than step 100.

At step 140A, any additional redeyes detected at step 130A are combined with the redeyes detected at step 100.

Figure 4:
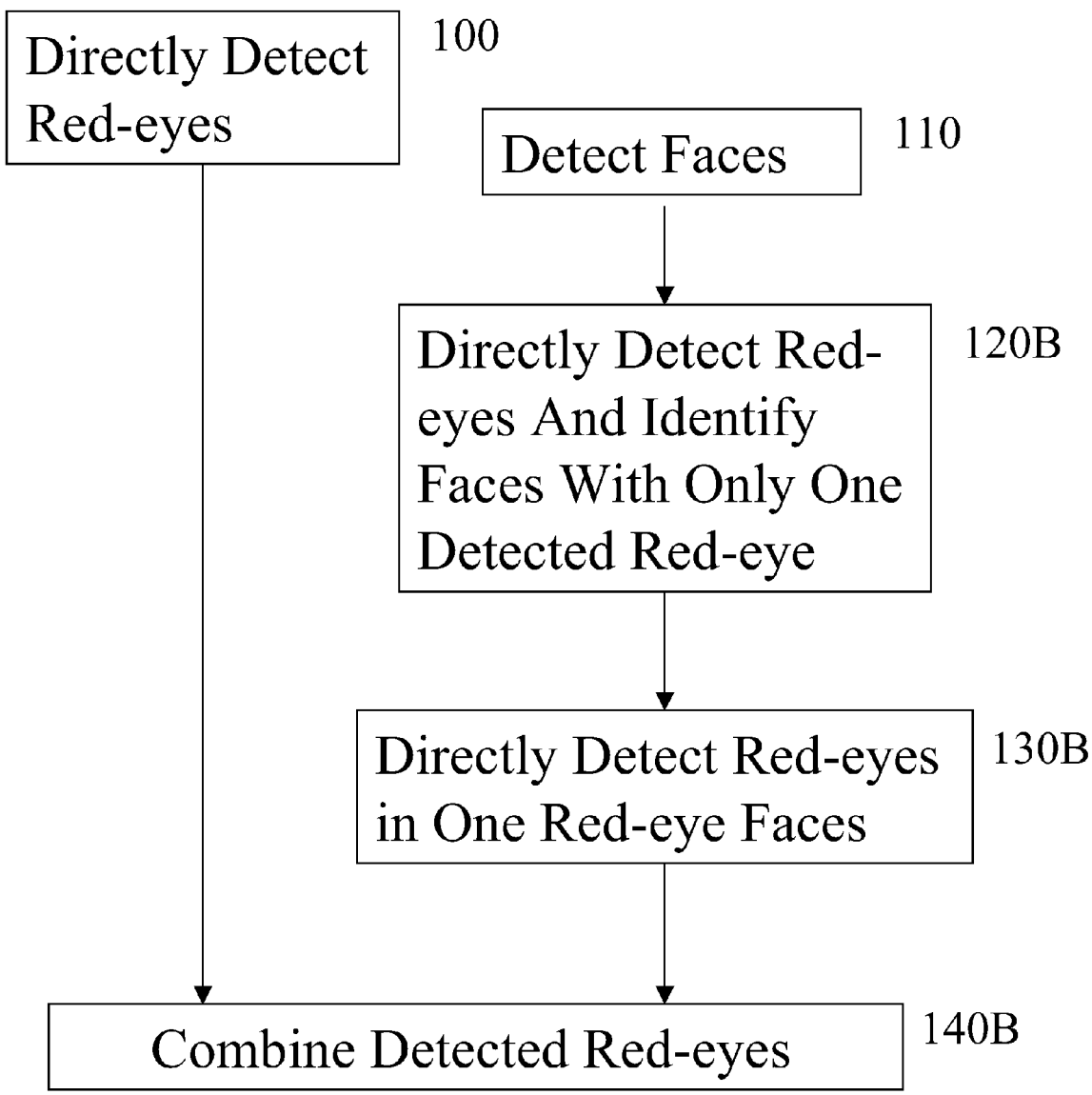
FIG. 4 is a flow diagram of a method according to a further embodiment.

In the above embodiments, redeye defects detected at step 100 are used in conjunction with faces detected at step 110 to determine initially the number of redeye candidates in any face. However, in a further embodiment, the processes 100 and 110 can operate in parallel. Referring to FIG. 4, the digital image is examined 100, using a direct detection method to detect individual redeye and the digital image is also examined 110 to detect face regions. Next, at step 120B a direct detection method is applied to the detected face regions of the image, to detect redeyes. Those detected face regions, each including only one detected redeye, are then identified.

Having located probable face regions in step 110, the search criteria applied at step 120B to locate redeyes within the detected face regions differ from those used at step 100. Preferably, the search criteria applied at step 120B are less stringent than those applied at step 100 since a candidate redeye detected at step 120B is more likely to be an actual redeye than a spurious detection.

At step 130B, each face region identified at step 120B is re-examined, again by a direct detection method, to detect redeyes in the face region.

In this embodiment, the search criteria are applied at step 130B to locate a second redeye of a pair and differ from the search criteria applied at steps 100B and 120B. Preferably, the search criteria applied at step 130B are less stringent than the search criteria applied at steps 100B and 120B. More relaxed search criteria at step 130B increase the probability of detecting a second redeye (if present) of a pair that was not detected at steps 100B and 120B. Alternatively the search criteria may be more sophisticated, resulting in more calculations. However, due to the region restrictions of the known face size and the location of the first eye; such more complex filters may still be efficiently processed in reasonable execution time.

At step 140B, any additional redeyes detected at step 130B are combined with the redeyes detected at step 100B.

In a further alternative embodiment, only the detected face regions each having no redeyes are identified and re-examined at step 130B. Preferably, the search criteria used at step 130B in this embodiment, are more stringent than the search criteria used at step 130B in the previous embodiment.

In a further alternative embodiment, the detected face regions each including only one detected redeye or no detected redeyes are identified and re-examined at step 130B.

The methods presented above have advantages including the following:

They increase the overall detection rate.
They increase the paired redeye detection.
  They keep the single redeye detection high.
  They act as a verification test which may reject false positives
  They increase the performance of running different filters based on the apriori existence of redeye in an image.

In a further variation of the preferred embodiment, the image being analysed is one of a stream of images. Face detection for example as described in U.S. application Ser. No. 11/464,083 filed Aug. 11, 2006 (Ref: FN143), hereby incorporated by reference, is performed on one or more of the images in the stream and detected faces are then tracked through the stream of images again as described in U.S. application Ser. No. 11/464,083 without needing to perform full face detection on every image.

Tracked face regions can be stored in memory or in metadata associated with the image being analysed or the stream including the image, and these can be utilised as the face regions within the image to be analysed, rather than needing to conduct complete face detection on any given image to be analysed.

Furthermore, it will be seen that it may not be necessary to carry out direct redeye detection on the complete image. So, for example, direct redeye detection could be performed on tracked face regions (or at least regions in the vicinity of tracked face regions). If as in the embodiments described above, only 1 redeye or no redeye defects are detected in any given face region by direct redeye detection, then the redeye criteria can be relaxed as described above before repeating redeye analysis on the face region or a portion thereof.

So for example, if 1 redeye defect were detected in a given quadrant of a face region, then relaxed criteria could be applied to the opposing quadrant of the face region on the assumption that this would be the most likely location of a second eye for a face of a given likely orientation.

If no redeyes were detected in a face region, then relaxed criteria could be applied to an upper half of a face region, depending on the likely orientation of the face.

Also, when a pair of redeyes is detected in a same face, then the redeyes are corrected so that they appear similar after correction. Either same pixels are used for the correcting, or after correcting, pixels of one or both of the eyes are further corrected so that the two eyes match.

In general, for non-redeye defects in LAB color space, the L and possibly b characteristics of the pixels may be either saturated and/or distorted. This means that unlike redeye defects, in these cases the original image information may be totally lost.

Thus, for cases where the second eye of a detected pair comprises a non-redeye defect, such as a yellow artefact, a white artefact or combination thereof, texture information derived from the pixels of the redeye of the pair is utilised in order to correct the non-redeye defect and reconstruct the eye.

However, it will be appreciated that such texture information may be derived from pixels of any detected redeye within the image, and utilized in order to correct the non-redeye defect and reconstruct the eye.

In the preferred embodiment, texture information comprising color information is derived from a selection of ex-red pixels with L and b values which lie in the median for that region (between the 30% and 70% points on a cumulative histogram for L and b). These color samples (from the already corrected eye) are used to create the same texture on both eyes of the eye pair.

It will be appreciated that rather than using corrected pixels from the redeye defect, the texture information may be derived from a selection of un-corrected pixels of the redeye and this texture information can be adapted when correcting the non-redeye defect Similarly, where the second eye of a detected pair comprises a combined redeye and non-redeye defect, such as a yellow artefact, a white artefact or any combination thereof, texture information derived from the correction of the pixels of the first redeye of the pair is utilised in order to correct the non-redeye defect of the second eye.

Alternatively, texture information derived from the pixels of the red artefact of the second eye of the detected pair is utilised in order to correct the non-red artefact(s) of the second eye. Such correction of the non-redeye defects is preferably carried out in accordance with the procedure disclosed in U.S. application Ser. No. 11/282,955 filed Nov. 18, 2005. However, it is appreciated that said texture information may be derived from the pixels of the red artefact of the second eye prior to the correction of those pixels.

The invention is not limited to the embodiments described herein which may be modified or varied without departing from the scope of the invention.

In addition, the subject matter disclosed in all reference cited above, as well as the background, brief description of the drawings, and the invention summary, are incorporated by reference into the detailed description as disclosing alternative embodiments.

In addition, U.S. provisional applications Nos. 60/865,375 filed Nov. 10, 2006; and 60/865,622 filed Nov. 13, 2006, are hereby incorporated by reference.

The invention claimed is:

1. A method for detecting redeye in a digital image, comprising:
    a) examining at least a portion of the image to detect redeye defects using first search criteria;
    b) examining the image for detected face regions;
    c) from the results of steps a) and b), identifying those detected face regions each having only one detected redeye defect; and
    d) examining at least a portion of the face regions identified in c), using second search criteria to determine if a second redeye defect is present in one or more of said face regions, and
    wherein the first search criteria and the second search criteria each comprise a corresponding filter set; and
    wherein the filter set corresponding to the second search criteria comprises less filters than the filter set corresponding to the first search criteria.

2. A method for detecting redeye in a digital image, comprising:
    a) examining at least a portion of the image to detect redeye defects using first search criteria;
    b) examining the image for detected face regions;
    c) from the results of steps a) and b), identifying those detected face regions each having only one detected redeye defect; and
    d) examining at least a portion of the face regions identified in c), using second search criteria to determine if a second redeye defect is present in one or more of said face regions, and
    wherein the first search criteria and the second search criteria each comprise a corresponding filter set, wherein said image comprises an image within a stream of images and
    wherein said face regions are detected in one or more images of said stream, said face regions being extrapolated from said one or more images to said image.

3. A method for detecting redeye in a digital image, comprising:
    a) examining at least a portion of the image to detect redeye defects using a first search criteria;
    b) examining the image for detected face regions;
    c) from the results of a) and b), identifying each of those detected face regions having no detected redeye defects;
    d) examining at least a portion of the face regions identified in c), using second search criteria to detect additional redeye defects in said face regions; and
    e) combining the results from a) and d), and
    wherein the first search criteria and the second search criteria each comprise a corresponding filter set; and
    wherein the filter set corresponding to the second search criteria comprises less filters than the filter set corresponding to the first search criteria.

4. A method for detecting pairs of redeye in a digital image, comprising:
    a) examining at least a portion of the image to detect redeye defects using a first search criteria;
    b) examining the image for detected face regions whereby said detected redeye defects are enclosed within the periphery of said detected face regions;
    c) identifying said detected face regions each having only one detected redeye defect;
    d) examining at least a portion of the face regions identified in c), using second search criteria, to detect a second redeye defect in one or more said face regions; and
    e) combining the results from a) and d); and
    determining the orientation of said detected face regions; and
    wherein said second search criteria includes a search based on said determined orientation of said detected face regions.

5. A method for detecting pairs of redeye in a digital image, comprising:
    a) examining at least a portion of the image to detect redeye defects using a first search criteria;
    b) examining the image for detected face regions whereby said detected redeye defects are enclosed within the periphery of said detected face regions;
    c) identifying said detected face regions each having only one detected redeye defect;
    d) examining at least a portion of the face regions identified in c), using second search criteria, to detect a second redeye defect in one or more said face regions; and
    e) combining the results from a) and d); and
    wherein said second search criteria includes anthropometric data relevant to said detected face regions and a determined location of a second eye based on a known location of said one detected redeye defect; and
    wherein said second search criteria includes a search based on said determined orientation of said detected face regions.

6. A method as claimed in claim 2 wherein the examining at least a portion of the image to detect redeye defects comprises examining said detected face regions for redeyes.

7. A method as claimed in claim 1, further comprising:
    e) combining the results of step a) and step d).

8. A method as claimed in claim 1 wherein said step of examining at least a portion of the image to detect redeye defects comprises examining substantially said complete image for redeye defects and wherein the examining at least a portion of the face regions comprises examining substantially said face region to determine if a second redeye defect is present.

9. The method claimed in claim 1, wherein c) further comprises identifying those detected face regions each having no detected redeye defects.

10. The method claimed in claim 1 wherein the second search criteria are less stringent than the first search criteria.

11. The method claimed in claim 10 wherein filter parameters of the filter set corresponding to the second search criteria are set broader than filter parameters of the filter set corresponding to the first search criteria.

12. The method claimed in claim 1 or claim 3, wherein the filter set corresponding to the second search criteria comprises less filters than the filter set corresponding to the first search criteria.

13. The method claimed in claim 12 wherein the filter set corresponding to the second search criteria include filters arranged to detect non-redeye defects.

14. The method according to claim 13 further comprising:
   detecting non-redeye defect pixels; and
   correcting said non-redeye defect pixels by utilizing texture information derived from pixels of a detected redeye defect.

15. The method according to claim 14 wherein said texture information is derived from un-corrected pixels of said redeye defect.

16. The method according to claim 14 wherein said texture information is derived from corrected pixels of said redeye defect.

17. The method according to claim 14 wherein said texture information is derived from corrected pixels of a redeye defect located within the same face region as said second redeye defect.

18. The method according to claim 14, wherein said texture information comprises color information.

19. The method according to claim 14, wherein the identified portion of the face region includes a combined redeye and non-redeye defect, and wherein said texture information is derived from redeye pixels of said combined eye defect.

20. The method claimed in claim 3, wherein c) further comprises identifying each of those detected face regions having only one detected redeye defect.

21. A non-transitory computer readable medium comprising computer program code which when executed on a digital image acquisition apparatus is arranged to perform the method of claim 1 or claim 3 or claim 4 or claim 5.

22. A digital image processing device operable to perform the method of claim 1 or claim 3 or claim 4 or claim 5.

23. A method as recited in 4,
   wherein said second search criteria includes a search based on said determined orientation of said detected face regions.

24. A digital image acquisition device configured to acquire a digital image and to perform the method of claim 1 or claim 3 or claim 4 or claim 5.

* * * * *